United States Patent
Sutcliffe et al.

(10) Patent No.: US 10,590,512 B2
(45) Date of Patent: Mar. 17, 2020

(54) METHOD FOR AMMONIACAL LEACHING OF COPPER FROM OXIDISED COPPER ORES

(71) Applicants: METALEACH LIMITED, Tortola (VG); Matthew Leslie Sutcliffe, Greater London (GB); Garry Mervyn Johnston, Claremonth (AU); Nicholas James Welham, South Lake (AU)

(72) Inventors: Matthew Leslie Sutcliffe, London (GB); Garry Mervyn Johnston, Claremont (AU); Nicholas James Welham, South Lake (AU)

(73) Assignee: METALEACH LIMITED, Tortola (VG)

( * ) Notice: Subject to any disclaimer, the term of this patent is extended or adjusted under 35 U.S.C. 154(b) by 232 days.

(21) Appl. No.: 15/314,279

(22) PCT Filed: May 28, 2015

(86) PCT No.: PCT/AU2015/000319
§ 371 (c)(1),
(2) Date: Nov. 28, 2016

(87) PCT Pub. No.: WO2015/179900
PCT Pub. Date: Dec. 3, 2015

(65) Prior Publication Data
US 2017/0191144 A1    Jul. 6, 2017

(30) Foreign Application Priority Data

May 28, 2014 (AU) .................. 2014902032

(51) Int. Cl.
*C22B 15/00* (2006.01)

(52) U.S. Cl.
CPC ........ *C22B 15/0078* (2013.01); *C22B 15/001* (2013.01); *Y02P 10/236* (2015.11)

(58) Field of Classification Search
CPC .................... C22B 15/0078; C22B 15/001
See application file for complete search history.

(56) References Cited

U.S. PATENT DOCUMENTS

| | | | | |
|---|---|---|---|---|
| 3,728,430 A | * | 4/1973 | Clitheroe | B03B 1/04 |
| | | | | 299/5 |
| 3,967,957 A | * | 7/1976 | Fonseca | C22B 15/0078 |
| | | | | 75/718 |
| 8,388,729 B2 | | 3/2013 | Welham et al. | |

FOREIGN PATENT DOCUMENTS

WO   WO-2012024744 A2   3/2012

OTHER PUBLICATIONS

Xiong, K. and G. S. Zheng. "Process Mineralogy and Flotation of a Copper Oxide Ore during Sulfuration Flotation." Advanced Materials Research. vols. 634-638, pp. 3460-3465. Available online Jan. 2013. https://doi.org/10.4028/www.scientific.net/AMR.634-638.3460 (Year: 2013).*

(Continued)

*Primary Examiner* — Tima M. McGuthry-Banks
(74) *Attorney, Agent, or Firm* — Harness, Dickey & Pierce, P.L.C.

(57) ABSTRACT

A method for leaching copper from an oxidized copper ore, wherein at least 5% of the copper present in the oxidized copper ore is an oxidized copper compound, the method comprising the method steps of: applying an aqueous solution of a curing agent to the oxidized copper ore to produce a cured ore; forming a leach solution by applying an ammoniacal solution that has an ammonium carbonate content of less than 5 g/L to the cured ore to produce a pregnant (Continued)

leach solution containing copper; and passing the pregnant leach solution to a means for recovering copper.

15 Claims, 2 Drawing Sheets

(56) References Cited

OTHER PUBLICATIONS

Ekmekyapar, Ahmet; Evrim Aktas, Asim Kunkul, & Nizamettin Demirkiran. "Investigation of Leaching Kinetics of Copper from Malachite Ore in Ammonium Nitrate Solutions." Metallurgical and Materials Transactions B. vol. 43B, pp. 764-772. August. ( Year: 2012).*

Kunkul, Asim; Abdulvahap Gulezgin & Nizamettin Demirkiran. "Investigation of the Use of Ammonium Acetate as an Alternative Lixiviant in the Leaching of Malachite Ore." Chemical Industry & Chemical Engineering Quarterly. 19(1) pp. 25-35. (Year: 2013).*

Arbiter, Nathaniel, et al., "Ammonia Leaching of Copper Sulfide Concentrates", Proceedings of Copper 99-Cobre 99 International Conference, vol. IV, 1999, pp. 197-212.

Oudenne, Paul D., et al., "Leaching Kinetics of Malachite in Ammonium Carbonate Solutions", Metallurgical Transactions B, vol. 14B, No. 1, Mar. 1983, pp. 33-40.

International Search Report for PCT/AU 2015/000319, dated Jul. 30.2015, ISA/AU.

Written Opinion for PCT/AU 2015/000319, dated Jul. 30, 2015, ISA/AU.

* cited by examiner

METHOD FOR AMMONIACAL LEACHING OF COPPER FROM OXIDISED COPPER ORES

CROSS-REFERENCE TO RELATED APPLICATIONS

This application is a U.S. National Phase Application under 35 U.S.C. 371 of International Application No. PCT/AU2015/000319, filed on May 28, 2015, which claims priority to Australian Patent Application No. 2014902032, filed on May 28, 2014. The entire disclosures of the above applications are incorporated herein by reference.

FIELD OF THE INVENTION

The present invention relates to a method for leaching copper from oxidised copper ores. More particularly, the present invention relates to a method for leaching copper from oxidised copper ores using an ammoniacal medium.

BACKGROUND ART

Many prior art reports of ammoniacal leaching have used tank or vat leaching, in which the ore or concentrate is simply immersed directly into ammoniacal solution.

Although many methods for ammoniacal leaching are described in the literature, including the patent literature, all require one or more of multiple leaching stages, energy-intensive pre-treatment of the ore (for example roasting or grinding) and/or elevated leach temperatures and/or pressures. These requirements necessitate complicated engineering and significant energy consumption, so it is little surprise that none have been widely adopted.

Further, many ammoniacal leaching methods either suffer from significant ammonia loss, or require complicated chemistry or engineering to overcome such, providing a further impediment to the widespread adoption of ammoniacal leaching methods.

The method of leaching of the present invention has as one object thereof to overcome the abovementioned problems associated with the prior art, or to at least provide a useful alternative thereto.

Throughout this specification, unless the context requires otherwise, the word "comprise", or variations such as "comprises" or "comprising", will be understood to imply the inclusion of a stated integer or group of integers but not the exclusion of any other integer or group of integers.

The discussion of the background art is included exclusively for the purpose of providing a context for the present invention. It should be appreciated that the discussion is not an acknowledgement or admission that any of the material referred to was common general knowledge in the field relevant to the present invention in Australia or elsewhere before the priority date.

DISCLOSURE OF THE INVENTION

In accordance with one aspect of the present invention there is provided a method for leaching copper from an oxidised copper ore wherein at least 5% of the copper present in the oxidised copper ore is in the form of an oxidised copper compound, the method comprising the method steps of:

applying an aqueous solution of a curing agent to the oxidised copper ore, producing a cured ore;

forming a leach solution by applying an ammoniacal solution that has an ammonium carbonate content of less than 20 g/L to the cured ore, producing a pregnant leach solution containing copper; and passing the pregnant leach solution to a means for recovering copper.

In accordance with a further aspect of the present invention there is provided a method for leaching copper from an oxidised copper ore wherein at least 5% of the copper present in the oxidised copper ore is in the form of an oxidised copper compound, the method comprising the method steps of:

applying an aqueous solution of a curing agent to the oxidised copper ore, producing a cured ore;

forming a leach solution by applying an ammoniacal solution that has an ammonium carbonate content of less than 20 g/L to the cured ore, wherein the leach solution maintains a pH between 6 and 13; producing a pregnant leach solution containing copper; and passing the pregnant leach solution to a means for recovering copper In accordance with a further aspect of the present invention there is provided a method for leaching copper from an oxidised copper ore wherein at least 5% of the copper present in the oxidised copper ore is in the form of an oxidised copper compound, the method comprising the method steps of:

applying an aqueous solution of a curing agent to the oxidised copper ore, producing a cured ore;

forming a leach solution by applying an ammoniacal solution that has an ammonium carbonate content of less than 20 g/L to the cured ore, wherein the leach solution maintains a pH between 8 and 11;

producing a pregnant leach solution containing copper; and passing the pregnant leach solution to a means for recovering copper.

The present invention consists in improvements in or relating to the treatment of oxidised copper ores containing oxidized copper compounds, for the at least partial removal of the contained metal therefrom by hydrometallurgical methods.

Throughout this specification, unless the context requires otherwise, the term "ore" or variations thereof, will be understood to include, for example, the product of one or more pre-treatment steps, such as a roast or calcination steps, or one or more concentration steps, but is not limited thereto. The term "ore" or variations thereof, will also be understood to include, for example, the copper-bearing waste from copper smelting processes, such as slag.

As would be understood by a person skilled in the art, the term oxidised copper ore refers to copper ore in which at least a portion of the copper containing ore has undergone an oxidation process. Throughout this specification, unless the context requires otherwise, the term "oxidised copper ore" or variations thereof, will be understood to include ores where a proportion of the primary sulphide minerals have been weathered to non-sulphide minerals.

It will be understood that the expression oxidised copper ores as used herein includes ores which contain silicates, carbonates, sulphates, oxides, hydroxides, arsenates, halides and similar oxidized metallic compounds; the term is used herein in contradistinction to the generic term "sulphide ores".

Most primary ore minerals are only stable in anaerobic dry environments. With the rise and fall of the water-table and downward percolating rainwater (containing dissolved oxygen), these minerals dissolve and new minerals (oxide zone minerals) are precipitated. Also many copper deposits contain both sulfide and oxidized copper minerals in close association. For example, many near surface deposits of copper sulfide minerals are partially converted by weathering effects to mixed sulfide-oxidized ore. Also, many ore bodies which were opened and originally mined as sulfide ores have over the years become partially oxidized.

It will therefore be apparent to those skilled in the art that the present process is applicable both to naturally occurring minerals and the like, or to, artificially prepared compounds, in which the metals are present in an oxidized condition, and soluble in a solvent of the kind referred to, such as for example a roasted sulphide ore.

As would be understood by a person skilled in the art, the term oxidised copper compound refers to a compound in which copper has been combined chemically with an oxyanion. There are many ores which contain oxidized copper compounds such as oxides of copper such as cuprite ($Cu_2O$) or tenorite (CuO), carbonate of copper or hydrated basic carbonate of copper such as malachite and azurite; silicate of copper such as chrysocolla ($CuO.SiO_2.2H_2O$), or dioptase ($CuO.SiO.H_2O$); oxychloride of copper such as atacamite ($CuCl_3.3Cu(OH)_2$). Many oxidised copper ores contain two or more oxidized copper compounds.

Oxidised copper ores are also known to contain naturally occurring elemental copper, or a copper-rich alloy, typically called native copper. Despite the copper having a valence of zero, it is still considered to be an oxidised copper compound.

In one form of the present invention, the oxidised copper compound is selected from compounds containing copper combined with one or more of the following anions: silicate, carbonate, sulphate, oxide, hydroxide, arsenate or halide.

In one form of the present invention, the oxidised copper compound is selected from the following: cuprite ($Cu_2O$), tenorite (CuO), malachite, azurite, chrysocolla ($CuO.SiO_2.2H_2O$), atacamite ($CuCl_3.3Cu(OH)_2$), or dioptase ($CuO.SiO.H_2O$).

The ore to be treated by the present invention has a requirement that at least 5% of the copper present in the oxidised copper ore is an oxidised copper compound. The remainder of the copper in the ore can be present in any other compound or mineral, though given most carbonates occur naturally as a result of the weathering of sulphide, the remainder of the copper is most likely present as a sulphide. The remainder of the non-copper containing compounds present in the oxidised copper ore to be treated may be anything, including carbonates.

As would be recognised by those skilled in the art, this process may form part of a larger flowsheet for processing copper ores. Where there is an economic proportion of the copper (or copper in combination with other valuable metals, e.g. nickel) present as sulphides, the outlined process may be used to treat the tailings of a prior flotation process to recover the sulphide minerals. Equally, it may be more economical to use the outlined process prior to recovery of the sulphide minerals by flotation The present process is envisaged to be especially applicable to carbonate-containing oxidised copper ores in which the oxidised copper compounds are both present in a mixture with the carbonate compounds or which are present in the same mineral as the carbonate compounds. Additionally, the oxidised copper compounds may be present in a mixture with other copper containing minerals. Preferably, the oxidised copper ore contains at least 0.5% copper present as a copper oxide mineral. Preferably still, the oxidised copper ore contains at least 0.6% copper present as a copper oxide mineral. Preferably still, the oxidised copper ore contains at least 0.8% copper present as a copper oxide mineral. Preferably still, the oxidised copper ore contains at least 1.0% copper present as a copper oxide mineral. Preferably still, the oxidised copper ore contains at least 1.2% copper present as a copper oxide mineral. Preferably still, the oxidised copper ore contains at least 1.5% copper present as a copper oxide mineral.

Preferably, the oxidised copper ore contains sufficient carbonate minerals to neutralise at least 0.5 kg of sulphuric acid per tonne. Preferably still, the oxidised copper ore contains sufficient carbonate minerals to neutralise at least 1 kg of sulphuric acid per tonne. Preferably still, the oxidised copper ore contains sufficient carbonate minerals to neutralise at least 2 kg of sulphuric acid per tonne. Preferably still, the oxidised copper ore contains sufficient carbonate minerals to neutralise at least 4 kg of sulphuric acid per tonne. Preferably still, the oxidised copper ore contains sufficient carbonate minerals to neutralise at least 7 kg of sulphuric acid per tonne. Preferably still, the oxidised copper ore contains sufficient carbonate minerals to neutralise at least 10 kg of sulphuric acid per tonne. Preferably still, the oxidised copper ore contains sufficient carbonate minerals to neutralise at least 15 kg of sulphuric acid per tonne. Preferably still, the oxidised copper ore contains sufficient carbonate minerals to neutralise at least 20 kg of sulphuric acid per tonne. Preferably still, the oxidised copper ore contains sufficient carbonate minerals to neutralise at least 25 kg of sulphuric acid per tonne. Preferably still, the oxidised copper ore contains sufficient carbonate minerals to neutralise at least 50 kg of sulphuric acid per tonne. Preferably still, the oxidised copper ore contains sufficient carbonate minerals to neutralise at least 75 kg of sulphuric acid per tonne. Preferably still, the oxidised copper ore contains sufficient carbonate minerals to neutralise at least 100 kg of sulphuric acid per tonne. Preferably still, the oxidised copper ore contains sufficient carbonate minerals to neutralise at least 150 kg of sulphuric acid per tonne. Preferably still, the oxidised copper ore contains sufficient carbonate minerals to neutralise at least 200 kg of sulphuric acid per tonne. Preferably still, the oxidised copper ore contains sufficient carbonate minerals to neutralise at least 250 kg of sulphuric acid per tonne. Preferably still, the oxidised copper ore contains sufficient carbonate minerals to neutralise at least 300 kg of sulphuric acid per tonne. Preferably still, the oxidised copper ore contains sufficient carbonate minerals to neutralise at least 400 kg of sulphuric acid per tonne. Preferably still, the oxidised copper ore contains sufficient carbonate minerals to neutralise at least 500 kg of sulphuric acid per tonne. Preferably still, the oxidised copper ore contains sufficient carbonate minerals to neutralise at least 750 kg of sulphuric acid per tonne. Preferably still, the oxidised copper ore contains sufficient carbonate minerals to neutralise at least 1000 kg of sulphuric acid per tonne.

Preferably, the copper present as oxidised copper compounds is more than 5% of the total copper in the ore. Preferably still, the copper present as oxidised copper compounds is more than 10% of the total copper in the ore. Preferably still, the copper present as oxidised copper compounds is more than 15% of the total copper in the ore. Preferably still, the copper present as oxidised copper compounds is more than 20% of the total copper in the ore. Preferably still, the copper present as oxidised copper compounds is more than 25% of the total copper in the ore. Preferably still, the copper present as oxidised copper compounds is more than 30% of the total copper in the ore. Preferably still, the copper present as oxidised copper compounds is more than 40% of the total copper in the ore. Preferably still, the copper present as oxidised copper compounds is more than 50% of the total copper in the ore. Preferably still, the copper present as oxidised copper compounds is more than 60% of the total copper in the ore. Preferably still, the copper present as oxidised copper compounds is more than 70% of the total copper in the ore. Preferably still, the copper present as oxidised copper compounds is more than 80% of the total copper in the ore. Preferably still, the copper present as oxidised copper compounds is more than 90% of the total copper in the ore. Preferably still, the copper present as oxidised copper compounds is more than 95% of the total copper in the ore.

In one form of the present invention, the ore comprises one or more minerals selected from the group comprising; calcite, quartz, malachite, azurite, chrysocolla, dioptase, atacamaite and brochantite. Preferably, the ore comprises one or more minerals selected from the group comprising; quartz, calcite, malachite, azurite and chrysocolla.

The process of the present invention is intended for use on ores that have a low percentage by weight of sulphide minerals; as such minerals would be oxidised by the curing agent, thus uneconomically consuming additional curing agents. However, as would be understood by a person skilled in the art, ore bodies very rarely contain no sulphide materials and it is envisaged that the process of the present invention would remain economical even in with the presence of a low amount of sulphide minerals.

Curing

The inventors have discovered that an aqueous curing step is capable of rendering an oxidised copper ore amenable to effective leaching by an ammoniacal solution at atmospheric pressure, without the need for conventional physical pretreatments such as roasting or grinding, thereby offering significant energy savings. As is evident from the preceding definition of ore, the scope of the present invention should not be understood to exclude ores that have been pre-treated by conventional methods, and in such circumstances, the method of the present invention may afford better recoveries than conventional methods. In many cases, the improved recoveries afforded by the method of the invention may render an ore body commercially viable.

As would be understood by a person skilled in the art, the term curing is fundamentally distinct from leaching. Leaching describes a process by which a solution containing a leaching agent is contacted with an ore, the solution recovered and valuable metals extracted therefrom. The curing step of the present invention renders the oxidised copper ore to be leached more amenable to the leaching process, improving both the extent and rate of recovery of the copper. Without wishing to be bound by theory, this may arise from one or more of the oxidation the copper or otherwise refractory minerals containing the copper, the complexation of metal (target or non-target) and the mobilisation of metal (target or non target).

The scope of the present invention encompasses methods where the aqueous solution of the curing agent is collected after the step of curing the oxidised copper ore to be leached through the application of an aqueous solution of a curing agent, and metal values recovered therefrom. However, conventional aqueous leaching solutions do not fall within the meaning of aqueous solution of a curing agent, as they do not render the oxidised copper ore to be leached more amenable to the subsequent leaching process. For example, two stage ammoniacal leaching processes differ markedly from the method of the present invention as there is no enhancement of the second leaching stage by performance of the first.

However, in a preferred form of the invention, the step of curing the oxidised copper ore to be leached through the application of an aqueous solution of a curing agent more specifically comprises substantially retaining the curing agent in contact with the oxidised copper ore to be leached when the ammoniacal solution is added. As would be understood by a person skilled in the art, in many applications, it is virtually impossible to completely retain a solution in contact with the oxidised copper ore to be leached. For example, in a heap leaching context, it is virtually impossible to stop drainage from the ore.

Curing Agents: General

The nature and concentration of the curing agent depends on the mineralogy, texture and pore volume of the oxidised copper ore.

As would be understood by a person skilled in the art, the term texture describes the manner in which the minerals are arranged in the ore (e.g. goethite coating copper oxide minerals is a very different proposition to a copper oxide ore with associated goethite).

Throughout this specification, unless the context requires otherwise, the phrases "pore space" and "pore volume" refer to the space comprising the pores within the ore particles, as opposed to inter-particle pores created by any stacking process.

In one form of the invention, the curing agent is selected from the group: acid, base and metal complexing agent.

Curing Conditions: General

Further, and similarly, the most desirable conditions under which the oxidised copper ore is cured vary as the composition, mineralogy and texture of the ore varies. For example, the nature and concentration of the curing agent, the temperature at which the curing step occurs, the pH at which the curing step occurs and the time for which the oxidised copper ore is exposed to the curing agent may all be varied in response to the composition, mineralogy, texture and pore volume of the oxidised copper ore (with low pore volumes necessitating higher concentrations). In general however, the higher the concentration of the copper in the oxidised copper ore, the higher the concentration of the solution used in the curing step.

The curing agent may be an agent previously associated with leaching the copper from the oxidised copper ore. In such cases, the concentration of the curing agent in the aqueous solution of the curing agent will typically be substantially higher than the concentrations conventionally associated with leaching copper from the oxidised copper ore to render the oxidised copper ore to be leached more amenable to the leaching process.

In a highly preferred form of the invention, the step of curing the oxidised copper ore to be leached takes place at atmospheric pressure.

In a highly preferred form of the invention, the step of curing the oxidised copper ore to be leached takes place at ambient temperature.

The volume of the aqueous solution of the curing agent applied to the oxidised copper ore is a function of a number of parameters including, but not limited to, texture, residence time (the time for which the oxidised copper ore is exposed to the curing agent prior to the leaching step), the concentration of the curing agent and the leach conditions. However, in preferred embodiments of the invention, the volumes of aqueous solutions of curing agent exposed to the oxidised copper ore are as low as practicable. That is, preferred forms of the invention utilise low volumes of an aqueous solution of a curing agent of high concentration, and preferred methods for curing the oxidised copper ore to be leached through the application of an aqueous solution of a curing agent are those adapted to utilise low volumes of aqueous solution of the curing agent.

Although the identity of the curing agent, the volume and concentration of the aqueous solution of the curing agent, and the conditions under which the curing step takes place will differ for different oxidised copper ores, the present invention identifies a principle enabling the economical recovery of copper from a wide range of oxidised copper ores, in that conventional, energy-intensive physical pre-treatment techniques such as grinding or roasting, used successfully or otherwise in ammoniacal leaching, can be replaced or enhanced by using chemical curing techniques, where combinations of the activity of the curing agent and elevated concentrations of the curing agent render the oxidised copper ore amenable to the subsequent atmospheric ammoniacal leaching.

Aqueous solutions of curing agents are preferably low volumes of high concentration solutions. In a preferred form of the invention, the aqueous solution of the curing agent is at least 10% of the saturated concentration of the curing agent under the prevailing conditions. Preferably still, the aqueous solution of the curing agent is at least 20% of the saturated concentration of the curing agent under the prevailing conditions. Preferably still, the aqueous solution of the curing agent is at least 30% of the saturated concentration of the curing agent under the prevailing conditions. Preferably still, the aqueous solution of the curing agent is at least 40% of the saturated concentration of the curing agent under the prevailing conditions. Preferably still, the aqueous solution of the curing agent is at least 50% of the saturated concentration of the curing agent under the prevailing conditions. Preferably still, the aqueous solution of the curing agent is at least 60% of the saturated concentration of the curing agent under the prevailing conditions. Preferably still, the aqueous solution of the curing agent is at least 70% of the saturated concentration of the curing agent under the prevailing conditions. Preferably still, the aqueous solution of the curing agent is at least 80% of the saturated concentration of the curing agent under the prevailing conditions. Preferably still, the aqueous solution of the curing agent is at least 90% of the saturated concentration of the curing agent under the prevailing conditions.

Curing Conditions: Application of Curing Agent to the Ore

The aqueous solution of the curing agent may be generated in situ, such as by electrolytic means.

In one form of the invention, the step of curing the oxidised copper ore to be leached through the application of an aqueous solution of a curing agent more specifically comprises:
spraying the aqueous solution of the curing agent onto the oxidised copper ore prior to the step of leaching the cured ore at atmospheric pressure through the application of an ammoniacal solution.

The method of the present invention may include the step of:
reducing the size of the oxidised copper ore to be leached by grinding.

In a particular form of the invention, the method of the present invention includes the step of:
reducing the size of the oxidised copper ore to be leached by wet grinding,
wherein the ore is ground in contact with water or an aqueous grinding solution.

Where the invention comprises reducing the size of the oxidised copper ore to be treated by wet grinding, wherein the ore is ground in contact with water or a grinding aqueous solution, the aqueous grinding solution may be provided in the form of the aqueous solution of the curing agent.

In one form of the invention, the method comprises the steps of:
grinding the oxidised copper ore in an aqueous solution of a curing agent, thereby curing the oxidised copper ore to be leached through the application of an aqueous solution of a curing agent;
resting the oxidised copper ore for a predetermined period; then
ammoniacal solution forming a leach solution by applying of an ammoniacal solution to the cured ore; and
passing the pregnant leach solution to a means for metals recovery.

The method of the present invention may include a step of:
reducing the size of the oxidised copper ore to be leached by crushing.

In a particular form of the invention, the method of the present invention includes the step of:
reducing the size of the oxidised copper ore to be leached by wet crushing, wherein the ore is crushed in contact with water or an aqueous crushing solution.

Where the invention comprises reducing the size of the oxidised copper ore to be treated by wet crushing, wherein the oxidised copper ore is crushed in contact with water or an aqueous crushing solution, the aqueous crushing solution may be provided in the form of the aqueous solution of the curing agent.

In one form of the invention, the method comprises the steps of:
crushing the oxidised copper ore in an aqueous crushing solution of a curing agent thereby curing the oxidised copper ore to be leached through the application of an aqueous solution of a curing agent;
resting the oxidised copper ore for a predetermined period; then
ammoniacal solution forming a leach solution by applying of an ammoniacal solution to the cured ore; and
passing the pregnant leach solution to a means for metals recovery.

In one form of the invention, the step of curing the oxidised copper ore to be leached through the application of an aqueous solution of a curing agent more specifically comprises:
stacking the oxidised copper ore to form a heap;
irrigating the surface of the heap with the aqueous solution of the curing agent such that the aqueous solution of the curing agent percolates down through the heap;
resting the oxidised copper ore for a predetermined period, prior to the step of forming a leach solution by applying of an ammoniacal solution to the cured ore.

In one form of the invention, the step of curing the oxidised copper ore to be leached through the application of an aqueous solution of a curing agent more specifically comprises:
immersing the oxidised copper ore in an aqueous solution of the curing agent for a sufficient time such that the curing solution infiltrates a desired fraction of pore volume;
resting the oxidised copper ore for a predetermined period prior to the step of forming a leach solution by applying of an ammoniacal solution to the cured ore.

The method of the present invention may include a step of:
  agglomerating the oxidised copper ore to be leached.

In a particular form of the invention, the method of the present invention includes the step of:
  agglomerating the oxidised copper ore to be leached by contacting the oxidised copper ore with water or an aqueous solution of an agglomerating agent.

In one form of the invention, the aqueous solution of the curing agent is also the aqueous solution of the agglomerating agent. That is, the aqueous solution contains both a curing agent and an agglomerating agent. In one form of the invention, the curing agent is an agglomerating agent, such that the step of curing the oxidised copper ore to be leached through the application of an aqueous solution of a curing agent more specifically comprises:
  agglomerating the oxidised copper ore with the aqueous solution of the curing agent;
  resting the oxidised copper ore for a predetermined period prior to the step of forming a leach solution by applying of an ammoniacal solution to the cured ore.

In a particular form of the invention, the method of the present invention includes the step of:
  agglomerating the oxidised copper ore with the aqueous solution of the curing agent and an agglomerating agent.

In a particular form of the invention the agglomerating agent is cement

In one form of the invention, the step of curing the oxidised copper ore to be leached through the application of an aqueous solution of a curing agent more specifically comprises:
  spraying the aqueous solution of the curing agent onto the oxidised copper ore; and
  resting the oxidised copper ore for a predetermined residence time, prior to the step of forming a leach solution by applying of an ammoniacal solution to the cured ore.

In a particular form of the invention, the method of the present invention comprises the step of:
  agglomerating the oxidised copper ore to be treated by contacting the ore with a >500 g/L sulphuric acid solution.

The predetermined time for which the oxidised copper ore is rested prior to the step of ammoniacal solution forming a leach solution by applying of an ammoniacal solution to the cured ore will be a function of a number of parameters including, but not limited to the particle size of the oxidised copper ore, the concentration of the curing agent and the texture of the oxidised copper ore.

In preferred forms of the invention, the predetermined period is between 5 minutes and twenty eight days. Preferably still, the predetermined period is between 30 minutes and 7 days. A person skilled in the art will realise that the curing time will be a function of particle size, small particles requiring substantially less curing time than large particles. A person skilled in the art will realise that a high concentration of curing agent will require a shorter resting time than a low concentration of curing agent.

The ideal extent of saturation of the pore space of the oxidised copper ore with the aqueous solution of the curing agent will depend largely on the texture of the ore. Preferably the step of curing the oxidised copper ore to be leached through the application of an aqueous solution of a curing agent saturates at least 50% of the pore space with solution. Preferably still, the step of curing the oxidised copper ore to be leached through the application of an aqueous solution of a curing agent saturates at least 60% of the pore space with solution. Preferably still, the step of curing the oxidised copper ore to be leached through the application of an aqueous solution of a curing agent saturates at least 70% of the pore space with solution. Preferably still, the step of curing the oxidised copper ore to be leached through the application of an aqueous solution of a curing agent saturates at least 80% of the pore space with solution. Preferably still, the step of curing the oxidised copper ore to be leached through the application of an aqueous solution of a curing agent saturates at least 90% of the pore space with solution.

Leaching: Pressure and Temperature

The most desirable conditions under which the cured ore is leached will vary as the conditions under which the ore is cured vary. For example, stronger cure solutions may require less aggressive leach solutions.

Methods for leaching ore at atmospheric pressure are well known to persons skilled in the art, and include heap leaching, vat leaching, tank leaching and dump leaching. In preferred forms of the invention, the step of ammoniacal solution forming a leach solution by applying of an ammoniacal solution to the cured ore, producing a pregnant leach solution takes place at ambient temperatures. Atmospheric leaching, particularly at ambient temperatures, is one of the least energy-intensive leaching techniques available. A curing step that is not energy intensive and that renders an ore amenable to an ammoniacal leaching step that is also not energy intensive has clear advantages over prior art methods.

Leaching: Ammoniacal Solution

Advantageously, the inventors have discovered that the leaching of oxidised copper ores does not necessarily require the addition of any buffering agents, such as ammonium carbonate, during the leach process. When carbonate is present, it fixes the operating pH to a relatively narrow range and is self-regulating as the carbonate content acts as a self-buffer. Importantly, the pH range buffered by the carbonate content is maintained at a range in which copper is soluble. A second advantage of carbonate systems is that there is less prospect of gypsum scaling as the sulphate level is always too low for precipitation to occur. The calcium level will also be low as the precipitation of $CaCO_3$ will occur whenever calcium ions are released into solution.

Preferably, the concentration of ammonium carbonate in the ammoniacal solution is less than 15 g/L. Preferably still, the concentration of ammonium carbonate in the ammoniacal solution is less than 12.5 g/L. Preferably still, the concentration of ammonium carbonate in the ammoniacal solution is less than 10 g/L. Preferably, the concentration of ammonium carbonate in the ammoniacal solution is less than 7.5 g/L. Preferably still, the concentration of ammonium carbonate in the ammoniacal solution is less than 5 g/L. Preferably still, the concentration of ammonium carbonate in the ammoniacal solution is less than 4 g/L. Preferably still, the concentration of ammonium carbonate in the ammoniacal solution is less than 3 g/L. Preferably still, the concentration of ammonium carbonate in the ammoniacal solution is less than 2 g/L. Preferably still, the concentration of ammonium carbonate in the ammoniacal solution is less than 1 g/L. Preferably still, the concentration of ammonium carbonate in the ammoniacal solution is less than 0.75 g/L. Preferably still, the concentration of ammonium carbonate in the ammoniacal solution is less than 0.5 g/L. Preferably still, the concentration of ammonium carbonate in the ammoniacal solution is less than 0.25 g/L. Preferably still, the concentration of ammonium carbonate in the ammoniacal solution is less than 0.1 g/L. Preferably still, the ammoniacal solution contains no ammonium carbonate.

Ammonical Solution

The ammonia of the ammoniacal solution may be generated in situ, such as by hydrolysis of urea.

The free ammonia concentration of the ammoniacal solution may be tailored to the rate at which the copper is leached from the cured ore, thereby minimising excess free ammonia and thus minimising ammonia losses due to evaporation. Specifically, the resulting pregnant leach solution preferably contains only a slight excess of free ammonia over that necessary to retain the copper in solution. As there is little free ammonia in the pregnant leach solution, ammonia losses due to evaporation are low. This is one of the major potential advantages of the present invention.

A person skilled in the art will readily be able to calculate the free ammonia concentration required to retain copper in solution at a desired concentration. The conditions under which ammoniacal complexes of copper form are readily calculable based on data contained in NIST Standard Reference Database 46, NIST Critically Selected Stability Constants of Metal Complexes: Version 6.0, the contents of which are incorporated by reference.

For example, where the ore contained 1% copper in a rapidly leaching form ammoniacal solution comprises about 1-5 g/L ammonia.

As would be realised by a person skilled in the art the level of ammonia in the solution applied in step (b) would be matched to the level of copper in the ore and the rate at which it leaches. A low grade ore where the copper leaches slowly would require a lower concentration of ammonia than a high grade ore where the leaching is rapid.

Selection of a suitable free ammonia concentration can be used to maintain a specific concentration of copper in the leach solution. If the concentration of free ammonia is less than the value necessary to achieve maximum dissolution the solution will become saturated with copper when all of the free ammonia is complexed. Leaching will therefore need to be performed for a longer period to achieve the same copper recovery. Whilst this may seen counter productive the constant concentration of copper in the leach solution makes it very substantially simpler to control the subsequent processes as the feed concentration will be invariant. Typical leaching plants have to deal with constantly varying leach solution concentrations which requires the process to be continually optimised. This is especially problematical in heap leach operations where the solution concentration decreases continually with time as the metal of interest is leached. In this process the quantity of copper is constant over time until the ore is essentially leached out. The capability to control the maximum solution tenor is a major advantage of the present invention.

Curing Agents

As stated in the context of the preceding general discussion of curing agents, generally above, the nature of the curing agent depends on the mineralogy of the ore, the texture of the ore and the pore volume of the ore.

A person skilled in the art will use either single curing agents or a suite of curing agents within the same cure solution according to the mineralogy, texture and pore volume of the oxidised copper ore. Some curing agents are chemically compatible, and may be applied simultaneously. Others may necessitate sequential curing. That is, the step of curing the oxidised copper ore to be leached through the application of an aqueous solution of a curing agent, producing a cured ore may comprise the steps of:

curing the oxidised copper ore to be leached through the application of a first aqueous solution of a first curing agent; then further curing the oxidised copper ore to be leached through the application of a second aqueous solution of a second curing agent.

Examples of chemically incompatible curing agents include acids and bases. Specifically, in one form of the invention, the first curing agent may be provided in the form of an acid, and the second curing agent in the form of ammonia.

Further, the curing agent of the present invention need not act directly on the copper. For example, where the oxidised copper ore is a copper silicate the curing agent may be provided in the form of an aqueous fluoride solution which may complex the silica.

Curing Agent

In a preferred form of the invention the curing agent is selected from the group: metal complexing agent, acid, base and combinations thereof. In a preferred form of the invention the curing agent is selected from the group: metal complexing agent and combinations thereof. In a preferred form of the invention the curing agent is a metal complexing agent.

Preferably, where the copper is present in either zero or monovalent form, e.g. in native copper or cuprite the curing agent contains an oxidising agent, the oxidising agent may be selected from the group: hypochlorite, nitrate, chlorate, perchlorate, hydrogen peroxide, calcium peroxide, ferric and cupric. In preferred forms of the present invention the concentration of the oxidising agent is at least of 5 g/L. However, some ores may be advantageously cured by oxidising agent concentrations as low as 1 g/L. In a preferred case, the oxidising agent is oxygen which is added by exposure to air or to oxygen enriched air.

As would be understood by the person skilled in the art, the purpose of the oxidizing agent is to oxidise lower valence copper compounds to cupric compounds. Furthermore, those skilled in the art will recognise that oxidising agents may also effect the oxidation of any sulphide minerals present thereby potentially increasing the leachability of copper from such minerals.

Where the ore is an oxide of copper in the form of malachite, azurite, brochantite or atacamite the curing agent is preferably provided in the form of ammonia. Preferably, the concentration of the ammonia in the aqueous solution of the curing agent is at least 30 g/L. However, some ores may be advantageously cured by ammonia concentrations as low as 1 g/L.

Where the ore is a silicate of copper in the form of chrysocolla or dioptase, the curing agent preferably comprises a solution of an acid at between pH 1 and 7. As will be recognised by those skilled in the art, such solutions can be prepared by diluting strong acids or using weak acids. However, some ores may be advantageously cured by acid pH as low as 0.

Means for Metal Recovery

The means for metal recovery of the present invention may comprise one or more of the following: solvent extraction, ion exchange, precipitation, absorption, crystallisation and cementation.

Combined Leach and Cure Solutions

In one form of the invention, the step of curing the oxidised copper ore to be leached through the application of a curing agent more particularly comprises curing the oxidised copper ore to be leached through the simultaneous application of a curing agent and a free ammonia solution.

In a highly convenient form of the invention, the curing agent is provided in the form of an aqueous free ammonia solution. Preferably still, the free ammonia concentration of the curing solution exceeds the free ammonia concentration of the ammoniacal solution of the leaching step.

Without wishing to be bound by theory, where the curing step involves simultaneous application of a free ammonia solution, the high ammonia concentration used solubilises copper within the pores and transports it towards the surface. Even after curing is concluded, the pores will contain a higher ammonia concentration that the leaching solution thereby giving enhanced diffusion of copper out of the ore during the step of leaching the cured ore through the application of an ammoniacal solution.

In one form of the invention, after the step of curing the oxidised copper ore to be leached through the application of a curing agent and before the step of leaching the cured ore through the application of an ammoniacal solution, the method of the present invention comprises the step of:

allowing the mixture of oxidised copper ore and curing agent to rest for a predetermined period.

In a preferred form of the invention, the predetermined period is at least one day.

The inventors of the present invention are also the inventors of prior patent publication WO2009009825 A1, in which it was demonstrated that an ore that has been treated with a curing agent was more amenable to leaching with an ammoniacal solution containing ammonium carbonate. Importantly, it was understood that when the target metal was copper, the ammonium carbonate concentration of the solution was preferably about 20 g/L ammonium carbonate. This was further demonstrated in the examples, where it was taught that the ammoniacal solution containing 20 g/L of ammonium carbonate was required to dissolve the copper species.

Advantageously and surprisingly, the inventors have now discovered that the when leaching copper from an oxidised copper ore, the ammoniacal solution does not require at least 20 g/L ammonium carbonate.

The inventors have demonstrated that even after reaction between the solubilised copper and the free ammonia there will be sufficient free ammonia remaining to maintain the solution above the pH at which copper will precipitate out of solution. As will be recognised by those skilled in the art, chemical equilibrium theory necessitates a small free ammonia concentration in solution where complexation occurs. There will be free ammonia present even in systems where the solubility of copper is controlled by selecting a specific starting free ammonia concentration. Accordingly, oxidised copper ores may be leached with ammoniacal solutions that have little to no ammonium carbonate.

BRIEF DESCRIPTION OF THE DRAWINGS

The present invention will now be described, by way of example only, with reference to one embodiment thereof and the accompanying drawing, in which: —

BEST MODE(S) FOR CARRYING OUT THE INVENTION

Figure 1:
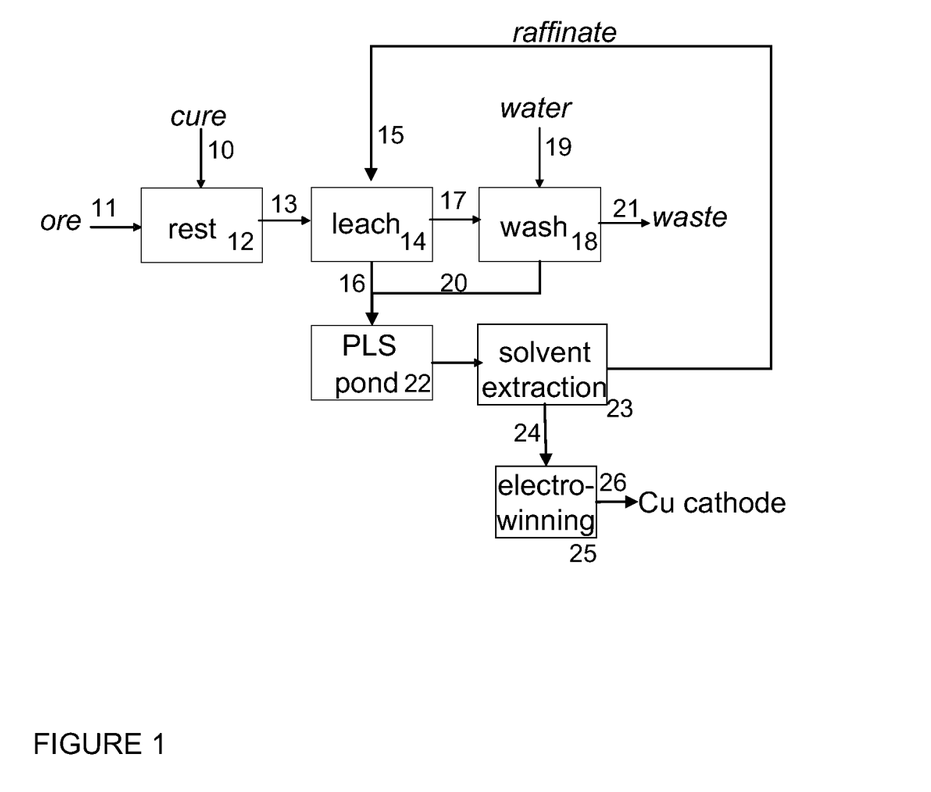
FIG. 1 is a schematic flow sheet of a method for leaching copper from an ore in accordance with the present invention.

A method for leaching copper from an ore in accordance with one embodiment of the present invention is now described. A copper oxide ore is used as the basis for this disclosure, metal recovery is by solvent extraction and electrowinning. The flowsheet is shown in FIG. 1.

The ore 11 is mixed with the cure 10 and heaped in order to allow the mixture to rest 12. After an appropriate time the rested ore 13 is irrigated in the leach step 14 using copper-depleted raffinate 15 from the solvent extraction unit 23. The pregnant leach solution 16 is sent to a storage pond 22 from which it I sent to solvent extraction 23 where the copper is selectively removed using, for example, a ketoxime or aldoxime such as LIX841. The copper is stripped into an acid solution 24 which passes to electrowinning 25 where copper cathodes 26 are produced. The leached solids 17 are irrigated with water 19 in order to recover any entrained copper and ammonia, the solution 20 being fed into the pregnant leach solution (PLS) pond 22. The barren solids 21 are disposed of in an appropriate manner.

EXAMPLE 1 (PROSPECTIVE)

A copper ore comprising malachite can be cured by contacting the ore with a volume of 70 g/L ammonia solution sufficient to fill 90% of the pore volume in the particles and resting for 24 h to produce a cured ore. After resting, the cured ore (along with any solution run off) is leached in a 30 g/L ammoniacal solution containing 0-50 g/L of ammonium carbonate for 24 h at which time a solution sample is taken for analysis. It is expected that the extent of leaching of copper will be unaffected by the concentration of ammonium carbonate.

EXAMPLE 2

A dolomite-hosted oxidised copper ore consisting of a mixture of the copper carbonates malachite and azurite was obtained. The head assay of the ore was 1.26% Cu. The acid neutralisation capacity at pH 1.5 was in excess of 200 kg $H_2SO_4$, which is economically too high for standard acid-based extraction processes.

Ground samples of the above ore ($P_{80}$ of 100 um) were divided into 10 g subsamples each of which were cured by mixing the ore with 2.5 mL of 70 g/L $NH_3$. After 24 h of curing, each cured sample was mixed with 50 mL of 70 g/L $NH_3$ with increasing concentrations of ammonium carbonate. After agitating for 24 h, the solution was analysed for copper to determine the recovery.

Figure 2:
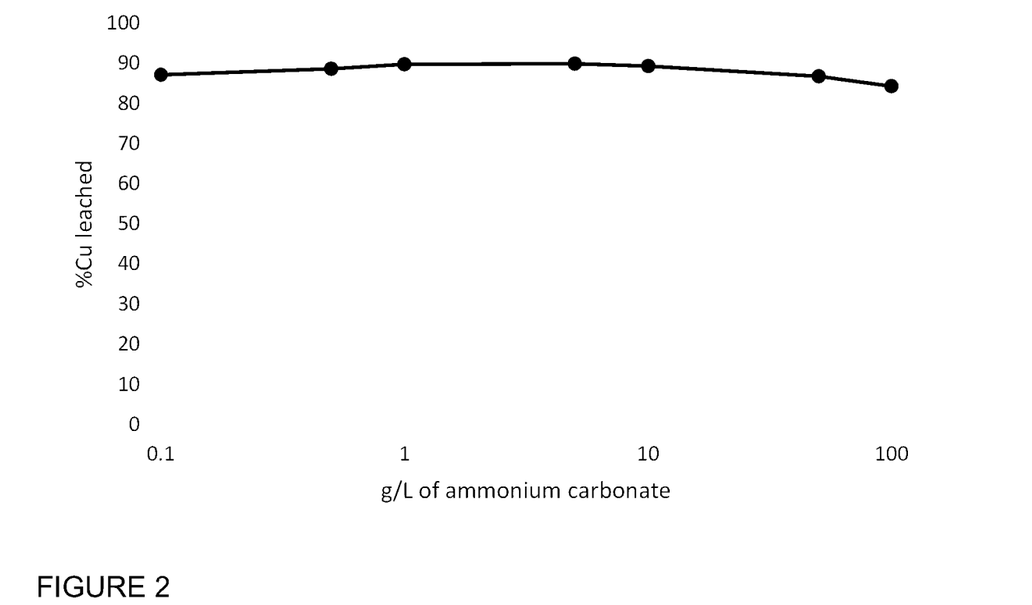
FIG. 2 is a graphical representation of the copper recovery as a function of the ammonium carbonate concentration for the samples of Example 2; and, FIG. 3 is a graphical representation of the copper recovery as a function of the ammonium carbonate concentration for the samples of Example 3.

The recovery as a function of the ammonium carbonate concentration is shown in FIG. 2. The run without any added ammonium carbonate is shown at 0.1 g/L. From this, it is clear that the concentration of ammonium carbonate is of low importance for this particular ore sample.

Without wishing to be bound by theory, it is believed that the carbonate minerals in the ore are dissolving and providing sufficient carbonate ion concentration in solution to aid dissolution. There appears to be a decrease in recovery at the highest ammonium carbonate concentrations. Again, without wishing to be bound by theory, it is believed that this is due to Le Chatelier's principle, whereby the high carbonate content in solution is beginning to limit the dissolution of the copper carbonate minerals.

EXAMPLE 3

Figure 3:
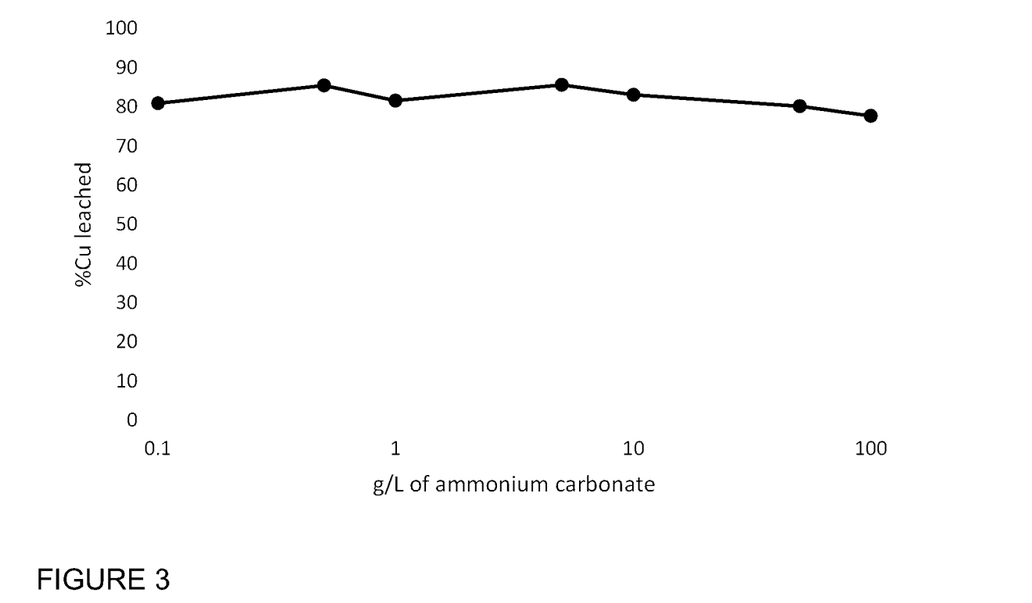

A dolomite-hosted oxidised copper ore containing 0.92% copper primarily as chrysocolla was ground to a $P_{80}$ of 75 um. Subsamples were cured in 1 g/L sulphuric acid for 24 h and then leached in 30 g/L $NH_3$ with increasing amounts of ammonium carbonate. After 24 h of agitation, the solution was analysed to determine the copper recovery which is shown in FIG. 3. The data point shown at 0.1 g/L on the x-axis did not have any ammonium carbonate added.

The extent of copper leaching is unaffected by the concentration of ammonium carbonate. Without wishing to be bound by theory, it is believed that the carbonate minerals in the ore are dissolving and providing sufficient carbonate ion concentration in solution to aid copper dissolution.

Although it is expected that the leaching behaviour will be specific to each combination of ore mineralogy and cure composition the inventors have demonstrated that providing there is sufficient carbonate ion obtained by dissolution of the minerals in the ore, the addition of ammonium carbonate can be reduced or even eliminated whilst maintaining similar recoveries. Clearly, the reduction or elimination of any reagent improves the economics and also simplifies the copper extraction process.

Modifications and variations such as would be apparent to the skilled addressee are considered to fall within the scope of the present invention.

The claims defining the invention are as follows:

1. A method for leaching copper from an oxidized copper ore, wherein at least 5% by weight of the copper present in the oxidized copper ore is in the form of an oxidized copper compound, the method comprising the method steps of:
   applying an aqueous solution of a curing agent to the oxidized copper ore;
   producing a cured ore;
   forming a leach solution by applying an ammoniacal solution that has an ammonium carbonate content of less than 0.75 g/L to the cured ore;
   producing a pregnant leach solution containing copper; and
   passing the pregnant leach solution to a means for recovering copper.

2. The method for leaching copper from an oxidized copper ore according to claim 1, wherein the leach solution maintains a pH between 8 and 11 during the leach process.

3. The method of leaching copper from an oxidized copper ore according to claim 1, wherein the copper is present in the ore as one, or more, compounds from the group: oxide, hydroxide, carbonate, silicate, sulfate, halide, arsenate, and phosphate including combinations thereof.

4. The method for leaching copper from an oxidized copper ore according to claim 1, wherein the oxidized copper ore has a carbonate content of at least 10 weight percent.

5. The method for leaching copper from a oxidized copper ore according to claim 1, wherein the oxidized copper ore contains sufficient carbonate to neutralize at least 5 kg of sulfuric acid, per ton.

6. The method for leaching copper from an oxidized copper ore according to claim 1, wherein the oxidized copper ore comprises one or more of the minerals selected from the group comprising: calcite, quartz, malachite, azurite, chrysocolla, dioptase, atacamite, and brochantite.

7. The method for leaching copper from an oxidized copper ore according to claim 1, wherein the ore comprises one or more minerals selected from the group comprising: malachite, azurite, and chrysocolla.

8. The method according claim 1, wherein the step of forming a leach solution by applying an ammoniacal solution to the cured ore is performed at atmospheric pressure.

9. The method according to claim 1, wherein the step of curing the ore to be leached through the application of an aqueous solution of a curing agent comprises substantially retaining the curing agent in contact with the ore to be leached when the ammoniacal solution is added.

10. The method according to claim 1, wherein the curing agent is selected from the group: acid, base, oxidizing agent, and metal complexing agent.

11. The method according to claim 1, wherein the step of curing the ore to be leached takes place at atmospheric pressure.

12. The method according to claim 1, wherein the step of curing the ore to be leached takes place at ambient temperature.

13. The method according to claim 1, wherein the step of curing the ore to be leached through the application of an aqueous solution of a curing agent saturates at least 50% of the pore space of the ore with the aqueous solution of the curing agent.

14. The method according to claim 1, wherein the step of leaching the cured ore at atmospheric pressure through the application of an ammoniacal solution, and producing a pregnant leach solution takes place at ambient temperature.

15. A method for leaching copper from an oxidized copper ore, wherein at least 5% by weight of the copper present in the oxidized copper ore is in the form of an oxidized copper compound, the method comprising the method steps of:
   applying an aqueous solution of a curing agent to the oxidized copper ore;
   producing a cured ore;
   forming a leach solution by applying an ammoniacal solution that has an ammonium carbonate content of less than 0.75 g/L to the cured ore, wherein the leach solution maintains a pH between 6 and 13;
   producing a pregnant leach solution; and
   passing the pregnant leach solution to a means for recovering copper.

* * * * *